United States Patent
Spector et al.

(12)

(10) Patent No.: US 10,466,423 B2
(45) Date of Patent: Nov. 5, 2019

(54) PARTITIONED OPTICAL SWITCH

(71) Applicant: The Charles Stark Draper Laboratory, Inc., Cambridge, MA (US)

(72) Inventors: Steven J. Spector, Lexington, MA (US); Michael G. Moebius, Allston, MA (US); Benjamin F. Lane, Sherborn, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/002,882

(22) Filed: Jun. 7, 2018

(65) Prior Publication Data

US 2018/0356597 A1    Dec. 13, 2018

Related U.S. Application Data

(60) Provisional application No. 62/516,602, filed on Jun. 7, 2017.

(51) Int. Cl.
*G02B 6/35* (2006.01)

(52) U.S. Cl.
CPC .......... *G02B 6/3548* (2013.01); *G02B 6/354* (2013.01); *G02B 6/3534* (2013.01); *G02B 6/3584* (2013.01); *G02B 6/3598* (2013.01)

(58) Field of Classification Search
CPC .... G02B 6/3548; G02B 6/3534; G02B 6/354; G02B 6/3584; G02B 6/3598; G02B 26/007; H04J 14/022; G01S 17/89
See application file for complete search history.

(56) References Cited

U.S. PATENT DOCUMENTS

| 4,013,000 A | 3/1977 | Kogelnik |
|---|---|---|
| 5,059,008 A | 10/1991 | Flood et al. |

(Continued)

FOREIGN PATENT DOCUMENTS

| WO | WO 96/08932 A1 | 3/1996 |
|---|---|---|
| WO | WO 03/098263 A2 | 11/2003 |
| WO | WO 2008/045126 A2 | 4/2008 |

OTHER PUBLICATIONS

International Searching Authority Authorized Officer: Menck, Alexander, Notification of Transmittal of the International Searching Authority; PCT/US2018/036538, dated Sep. 19, 2018, 15 pages.

(Continued)

*Primary Examiner* — Akm E Ullah
(74) *Attorney, Agent, or Firm* — Sunstein Kann Murphy & Timbers LLP

(57) ABSTRACT

A steerable optical transmit and receive terminal includes a MEMS-based N×1 optical switching network. Each optical switch in the switching network uses an electrostatic MEMS structure to selectively position a translatable optical grating close to or far from an optical waveguide. In the close ("ON") position, light couples between the translatable optical grating and the optical waveguide, whereas in the far ("OFF") position, no appreciable light couples between the translatable optical grating and the optical waveguide. The translatable optical grating is disposed at or near a surface of the optical switching network. Thus, the translatable optical grating emits light into, or receives light from, free space. The steerable optical transmit and receive terminal also includes a lens and can steer a free space optical beam in a direction determined by which port of the N×1 optical switching network is ON.

22 Claims, 9 Drawing Sheets

(56) References Cited

U.S. PATENT DOCUMENTS

| | | | |
|---|---|---|---|
| 5,392,157 A | 2/1995 | Shih | |
| 5,943,159 A | 8/1999 | Zhu | |
| 6,628,851 B1* | 9/2003 | Rumpf | G02B 5/1828 385/10 |
| 6,830,944 B1* | 12/2004 | Smits | B81B 3/0018 347/54 |
| 6,927,886 B2 | 8/2005 | Plesniak et al. | |
| 7,298,555 B2 | 11/2007 | Capps | |
| 7,864,419 B2 | 1/2011 | Cossairt et al. | |
| 2002/0048423 A1* | 4/2002 | Frick | G02B 6/124 385/10 |
| 2003/0198259 A1* | 10/2003 | Zhang | G02B 6/12004 372/20 |
| 2004/0033010 A1* | 2/2004 | McGuire, Jr. | G02B 6/272 385/16 |
| 2004/0080807 A1* | 4/2004 | Chen | G02B 26/0808 359/291 |
| 2009/0034042 A1 | 2/2009 | Tholl et al. | |
| 2013/0027715 A1 | 1/2013 | Imaki et al. | |
| 2015/0346340 A1 | 12/2015 | Yaacobi et al. | |
| 2016/0327751 A1 | 11/2016 | Wu et al. | |
| 2017/0003507 A1 | 1/2017 | Raval et al. | |
| 2017/0202528 A1* | 7/2017 | Roessl | G21K 1/06 |
| 2018/0175961 A1* | 6/2018 | Spector | G02B 6/3526 |
| 2019/0146087 A1* | 5/2019 | Mansur | G01S 17/08 |

OTHER PUBLICATIONS

Ashtiani, et al., "A Liquid Optical Phase Shifter With an Embedded Electrowetting Actuator," Journal of Microelectromechnical Systems, vol. 26, No. 2, 4 pages, Apr. 2017.

Chun, et al., "Spatial 3-D Infrastructure: Display-Independent Software Framework, High-Speed Rendering Electronics, and Several New Displays," appeared in Stereoscopic Displays and Virtual Reality Systems XII, Proceedings of SPIE-IS&T Electronic Imaging, SPIE vol. 5664, pp. 302-312, 2005.

Geng, "Three-dimensional display technologies," Advances in Optics and Photonics 5, pp. 456-535, 2013.

Halle, "Holographic stereograms as discrete imaging systems," SPIE Proceeding #2176 "Practical Holography VIII", 12 pages, Feb. 1994.

Holliman, et al., "Three-Dimensional Displays: A Review and Applications Analysis," IEEE Transactions on Broadcasting, vol. 57, No. 2, pp. 362-371, Jun. 2011.

Seok, et al., "Large-scale broadband digital silicon photonic switches with vertical adiabatic couplers: supplementary material," Optica, vol. 3, No. 1, pp. 64-70, Jan. 2016.

Seok, et al., "Large-scale broadband digital silicon photonic switches with vertical adiabatic couplers: supplementary material," Optica, 5 pages, Jan. 13, 2016.

Smithwick, et al., "Interactive Holographic Stereograms with Accommodation Cues," Practical Holography XXIV: Materials and Applications, SPIE, 14 pages, 2010.

Vivien, et al., "Experimental demonstration of a low-loss optical H-tree distribution using silicon-on-insulator microwaveguides," Applied Physics Letters, vol. 85, No. 5, 3 pages, Aug. 2, 2004.

International Searching Authority, European Patent Office, International Search Report and Written Opinion, International Application No. PCT/US2017/000095, 15 pages, dated Mar. 27, 2018.

International Searching Authority, European Patent Office, Invitation to Pay Additional Fees, International Application No. PCT/US2017/066885, 13 pages, dated Mar. 19, 2018.

International Searching Authority, European Patent Office, International Search Report and Written Opinion, International Application No. PCT/US2017/066885, 19 pages, dated May 14, 2018.

International Searching Authority, European Patent Office, Invitation to Pay Additional Fees and, Where Applicable, Protest Fee, International Application No. PCT/US2018/014668, 16 pages, dated May 14, 2018.

International Searching Authority, European Patent Office, International Search Report and Written Opinion, International Application No. PCT/US2018/014668, 21 pages, dated Jul. 5, 2018.

* cited by examiner

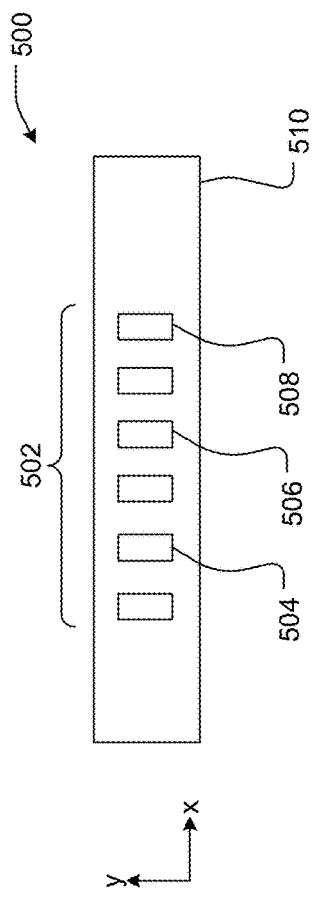
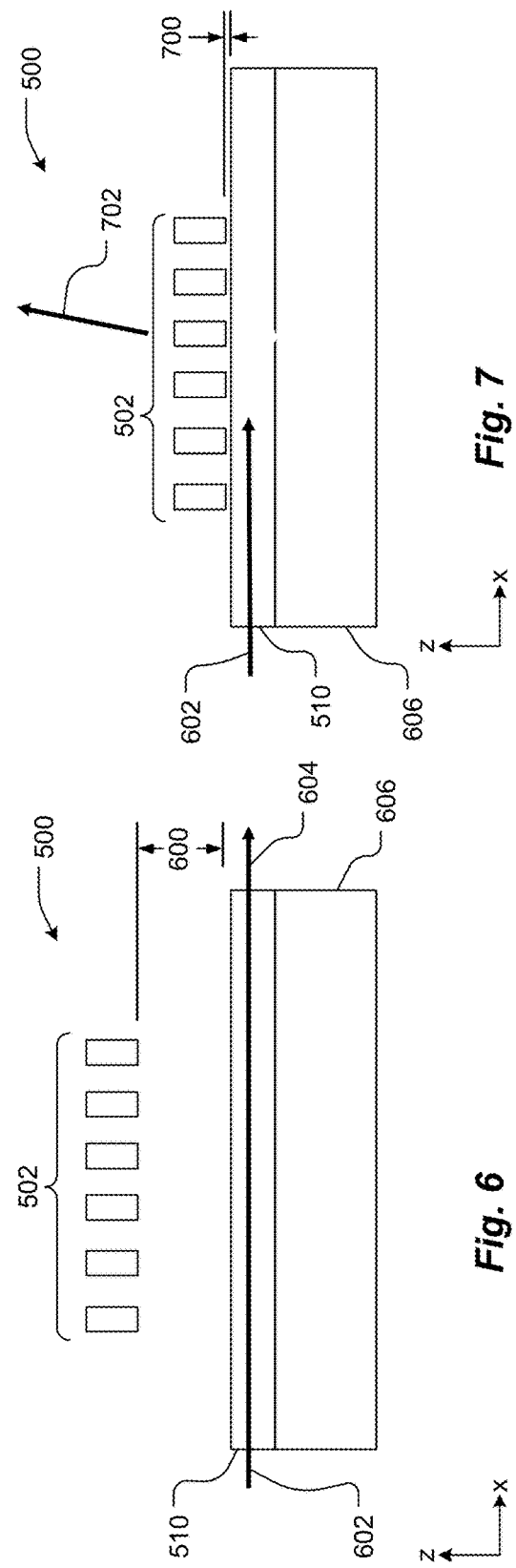

PARTITIONED OPTICAL SWITCH

CROSS REFERENCE TO RELATED APPLICATIONS

This application claims the benefit of U.S. Provisional Patent Application No. 62/516,602, filed Jun. 7, 2017, titled "Integrated MEMS Switches for Selectively Coupling Light In and Out of a Waveguide," the entire contents of which are hereby incorporated by reference herein, for all purposes.

BACKGROUND

Technical Field

The present invention relates to optical switches and, more particularly, to optical switches used to control directions in which optical signals are transmitted or received, such as in light direction and ranging (LiDAR) and laser communication systems.

Background Art

Many optical system need to emit or receive a (visible or invisible) collimated optical beam in a direction that can be controlled with high precision. For example, such optical beams are used in light direction and ranging (LiDAR) systems, and often these beams need to be steered or swept to locate or track a target. Similarly, laser communications systems sometimes need to steer an optical beam, such as to initially establish a line-of-sight communications channel between two terminals or if one or both of the terminals moves.

Prior art LiDAR and laser communications terminals use telescopes and either point the entire telescope using a gimbal or place a moveable steering mirror in front of the telescope and use the mirror to redirect the beam. However, this approach requires large and bulky moving systems, with attendant disadvantages in terms of size, mass, power and reliability.

Other conventional methods of beam steering involve optical phased arrays, in which a large number of antennas are arrayed closely together and operated coherently, i.e., the phases of the individual emitters are carefully controlled to make the entire array operate in unison. Signals in the near field constructively and destructively interfere to create nulls and reinforced signals in desired directions. However, phased arrays require large numbers of emitters and associated optical phase adjusters.

A nominal optical phased array has emitters disposed at half-wavelength spacings, i.e. apx. 0.5 µm. For applications, such as long-range laser communication, the required total aperture size might be on the order of 5 cm. Thus, one would need an array of $10^4 \times 10^4$ emitters and phase shifters. As currently demonstrated, phase shifters requires apx. 1 mW of power to operate. Thus, the total power consumption of such an array might approach $10^5$ W, an impractically large amount of power.

U.S. Provisional Patent Application No. 62/498,158, filed Dec. 16, 2016, titled "All-solid state optical transmit/receive terminal," ('158 patent application) the entire contents of which are incorporated by reference herein for all purposes, is assigned to the assignee of the present application. The '158 patent application discloses an optical transmit and receive terminal that includes an N×1 optical switch. The N×1 optical switch includes an "H-tree" arrangement of optical waveguides, rooted at a common input/output port. A binary optical switch is disposed at each junction of two optical waveguides of the H-tree. Settings of the binary optical switches determine a route for an optical signal traveling through the H-tree. Each binary optical switch may be implemented with a Mach-Zender interferometer, ring resonator or microelectromechanical systems (MEMS) device, such as a MEMS mirror. However, limitations on the densities at which the binary optical switches may be fabricated limit spatial resolution of the transmit/receive terminal, i.e., density of possible transmit or receive beam positions.

SUMMARY OF EMBODIMENTS

An embodiment of the present invention provides a partitioned optical switch. The partitioned optical switch includes a plurality of optical switch arrays. Each optical switch array of the plurality of optical switch arrays has a respective common port and a respective plurality of other ports that are distinct from other ports of other optical switch arrays of the plurality of optical switch arrays.

Each optical switch array of the plurality of optical switch arrays includes a respective waveguide optically coupled to the respective common port. Each optical switch array of the plurality of optical switch arrays also includes a respective plurality of optical switches disposed along the respective waveguide. Each optical switch of the plurality of optical switches is optically coupled between the respective waveguide and a respective port of the respective plurality of other ports.

Each optical switch of the plurality of optical switches includes a respective translatable optical grating. The translatable optical grating is configured to translate between at least two positions. A first position of the at least two positions is sufficiently close to the respective waveguide to optically couple with the respective waveguide with a coupling efficiency of at least about 25%. A second position of the at least two positions is sufficiently far from the respective waveguide to optically couple with the respective waveguide with a coupling efficiency of at most about 5%.

Each optical switch of the plurality of optical switches also includes a respective MEMS structure. The MEMS structure is configured to selectively translate the respective translatable optical grating to the first position and to the second position.

Optionally, the partitioned optical switch may include a respective optical receiver optically coupled to each common port.

Optionally, the partitioned optical switch may include a respective optical transmitter optically coupled to each common port.

Optionally, the partitioned optical switch may include a respective optical receiver optically coupled to each common port, and a respective optical transmitter optically coupled to each common port.

Optionally, the partitioned optical switch may include a respective optical receiver optically coupled to at least one common port.

Optionally, the partitioned optical switch may include a respective optical transmitter optically coupled to at least one common port.

Optionally, the partitioned optical switch may include a respective optical receiver optically coupled to at least one common port, and a respective optical transmitter optically coupled to at least one common port.

Optionally, the partitioned optical switch may include a respective optical receiver optically coupled to each port of a first set of common ports, and a respective optical transmitter optically coupled to each port of a second set of common ports.

Optionally, collectively, the plurality of other ports of the plurality of optical switch arrays may be arranged in a rectangular array. Optionally, each plurality of other ports may be arranged in a rectangular array.

Optionally, each plurality of other ports may be arranged in a single respective row.

Optionally, the partitioned optical switch may include a respective optical receiver optically coupled to each common port.

Optionally, the partitioned optical switch may include a respective optical transmitter optically coupled to each common port.

Optionally, the partitioned optical switch may include a respective optical receiver optically coupled to each common port, and a respective optical transmitter optically coupled to each common port.

Optionally, the partitioned optical switch may include a respective optical receiver optically coupled to at least one common port.

Optionally, the partitioned optical switch may include a respective optical transmitter optically coupled to at least one common port.

Optionally, the partitioned optical switch may include a respective optical receiver optically coupled to at least one common port, and a respective optical transmitter optically coupled to at least one common port.

Optionally, the partitioned optical switch may include a respective optical receiver optically coupled to each port of a first set of common ports, and a respective optical transmitter optically coupled to each port of a second set of common ports.

Optionally, each other port of each respective plurality of other ports may be optically coupled to free space.

Optionally, the plurality of optical switch arrays may define a planar surface, and the plurality of other ports may be disposed on the planar surface.

Optionally, the plurality of optical switch arrays may defines a surface, and each optical switch of each respective plurality of optical switches may be configured to optically couple between the respective waveguide and space beyond the surface of the plurality of optical switch arrays, when the respective optical switch is in the first position.

Optionally, the partitioned optical switch also includes a lens optically coupling the plurality of optical switch arrays to free space.

Optionally, the partitioned optical switch also includes a plurality of optical fibers optically coupling the plurality of other ports to the lens.

An embodiment of the present invention provides an optical switch. The optical switch includes a waveguide and a translatable optical grating. The translatable optical grating is configured to translate between at least two positions: a first position and a second position. When the translatable optical grating is in the first position of the at least two positions, the translatable optical grating is sufficient close to the waveguide to optically couple with the waveguide with a coupling efficiency of at least about 25%. When the translatable optical grating is in the second position of the at least two positions, the translatable optical grating is sufficiently far from the waveguide to optically couple with the second waveguide with a coupling efficiency of at most about 5%. The optical switch also includes a MEMS structure configured to selectively translate the translatable optical grating to the first position and to the second position.

Another embodiment of the present invention provides an optical switch array. The optical switch array includes a common input/output port and N other ports. A first waveguide is optically coupled to the common input/output port. A plurality of first optical switches is optically coupled to the first waveguide.

The optical switch array also includes a plurality of second waveguides. Each second waveguide of the plurality of second waveguides is optically coupled to the first waveguide via a respective first optical switch of the plurality of optical switches.

The optical switch array also includes a plurality of second optical switches. A respective subset of the plurality of second optical switches is optically coupled to each second waveguide of the plurality of second waveguides. Each second optical switch of the plurality of second optical switches is optically coupled between a respective second waveguide of the plurality of second waveguides and a respective port of the N other ports.

The optical switch array includes a translatable optical grating. The translatable optical grating is configured to translate between at least two positions. A first position of the at least two positions is sufficient close to the respective second waveguide to optically couple with the second waveguide with a coupling efficiency of at least about 25%. A second position of the at least two positions is sufficiently far from the respective second waveguide to optically couple with the second waveguide with a coupling efficiency of at most about 5%.

The optical switch array also includes a MEMS structure configured to selectively translate the translatable optical grating to the first position and to the second position.

Yet another embodiment of the present invention provides an optical send/receive terminal. The optical send/receive terminal includes a lens having a field of view and an optical switch array. The optical switch array includes a common input/output port and N other ports. The N other ports are optically coupled to the lens, such that each port of the N other ports is optically coupled to a unique portion of the lens field of view.

The optical switch array also includes a first waveguide optically coupled to the common input/output port and to a plurality of first optical switches optically coupled to the first waveguide.

The optical switch array also includes a plurality of second waveguides. Each second waveguide of the plurality of second waveguides is optically coupled to the first waveguide via a respective first optical switch of the plurality of optical switches.

The optical switch array also includes a plurality of second optical switches. A respective subset of the plurality of second optical switches is optically coupled to each second waveguide of the plurality of second waveguides. Each second optical switch of the plurality of second optical switches is optically coupled between a respective second waveguide of the plurality of second waveguides and a respective port of the N other ports.

Each second optical switch of the plurality of second optical switches includes a translatable optical grating. The translatable optical grating is configured to translate between at least two positions. A first position of the at least two positions is sufficient close to the respective second waveguide to optically couple with the second waveguide with a coupling efficiency of at least about 25%. A second position of the at least two positions is sufficiently far from the respective second waveguide to optically couple with the second waveguide with a coupling efficiency of at most about 5%.

Each second optical switch of the plurality of second optical switches also includes a MEMS structure configured to selectively translate the translatable optical grating to the first position and to the second position.

The optical send/receive terminal also includes an optical transmitter and/or an optical receiver optically coupled to the common input/output port of the optical switch array.

Optionally, a plurality of optical fibers optically may couple the N other ports to the lens.

Optionally, the optical switch array may define a surface and each second optical switch of the plurality of second optical switches may be configured to optically couple between the respective second waveguide and space beyond the surface of the optical switch array, when the second optical switch is in the first position.

Optionally, each translatable optical grating may include a respective MEMS structure.

Optionally, each first optical switch of the plurality of first optical switches may include a respective MEMS structure.

BRIEF DESCRIPTION OF THE SEVERAL VIEWS OF THE DRAWING

The invention will be more fully understood by referring to the following Detailed Description of Specific Embodiments in conjunction with the Drawings, of which:

FIG. 5 is a schematic top view of one second optical switch used in the optical switching array of the optical transmit/receive terminal of FIG. 1, according to an embodiment of the present invention.

FIG. 6 is a schematic side view of the first optical switch of FIG. 5 in an OFF position, according to an embodiment of the present invention.

FIG. 7 is a schematic side view of the first optical switch of FIG. 5 in an ON position, according to an embodiment of the present invention.

DETAILED DESCRIPTION OF SPECIFIC EMBODIMENTS

In accordance with embodiments of the present invention, methods and apparatus are disclosed for a steerable optical transmit and receive terminal and an associated MEMS-based optical switching network. Such a terminal does not require a phased array of emitters/collectors, nor the attendant large number of phase shifters. The optical switching network employs MEMS-based optical switches to steer the optical beam. However, the MEMS-based optical switches are significantly smaller than in the prior art, such as in H-tree based optical switches. Consequently, the optical switches may be fabricated or packed at a higher density than in the prior art, providing higher spatial resolution of the transmit/receive terminal, i.e., density of possible transmit/receive beam positions. A relatively small subset of the switches needs to be operated, therefore powered, at any given time. Therefore, the terminal overcomes the mechanical, switch density, emitter density and high power problems associated with the prior art.

Figure 1:
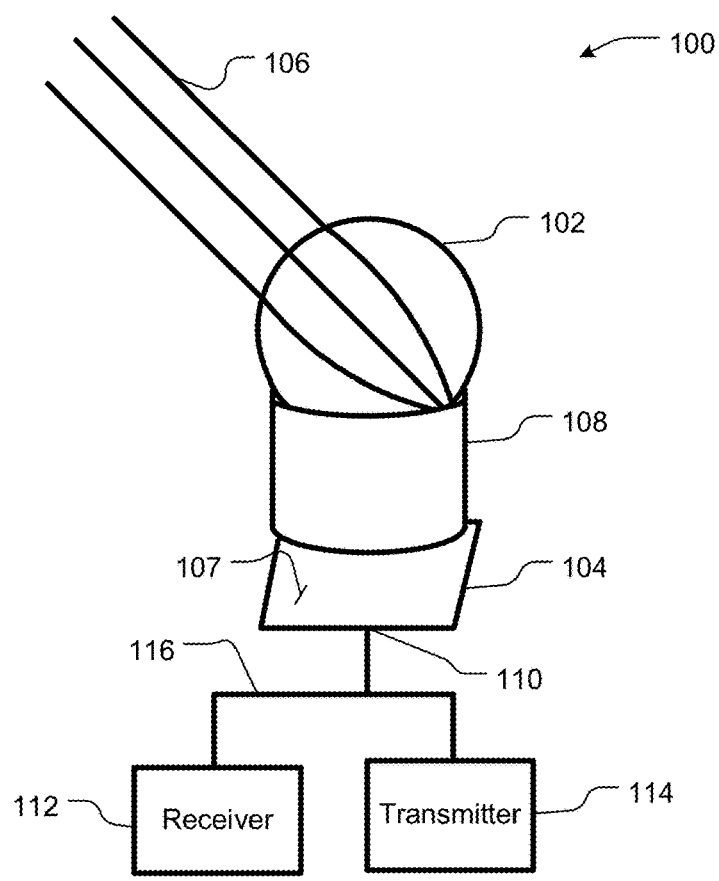
FIG. 1 is a schematic illustration of an optical transmit/receive terminal, according to an embodiment of the present invention.

FIG. 1 is a schematic illustration of an optical transmit/receive terminal 100, according to an embodiment of the present invention. A lens 102 is optically coupled to an optical switching array ("optical switching network" or "optical switch") 104, such that incoming light rays, represented by light rays 106, are focused on a surface 107 of the optical switch 104. Conversely, optical signals emitted at the surface 107 of the optical switch 104 are optically coupled to the lens and, thereby, projected into space as light rays 106.

The lens 102 is preferably a wide field-of-view lens. The lens 102 may, for example, be a gradient index (GRIN) lens, fisheye lens or monocentric lens. A suitable monocentric lens is available from Distant Focus Corporation, PO Box 7857, Champaign, Ill. 61826-7857. If the lens creates a planar focused image, the lens 102 and the optical switch 104 may be optically coupled by air or a vacuum 108. However, if the lens creates a curved focused image, a bundle of optical fibers 108 may be used to optically couple the lens 102 to the optical switch 104. One end of each optical fiber of the bundle of optical fibers 108 may terminate on the surface of the lens 102, and the other end of the optical fiber may terminate on the surface 107 of the optical switch 104.

Figure 2:
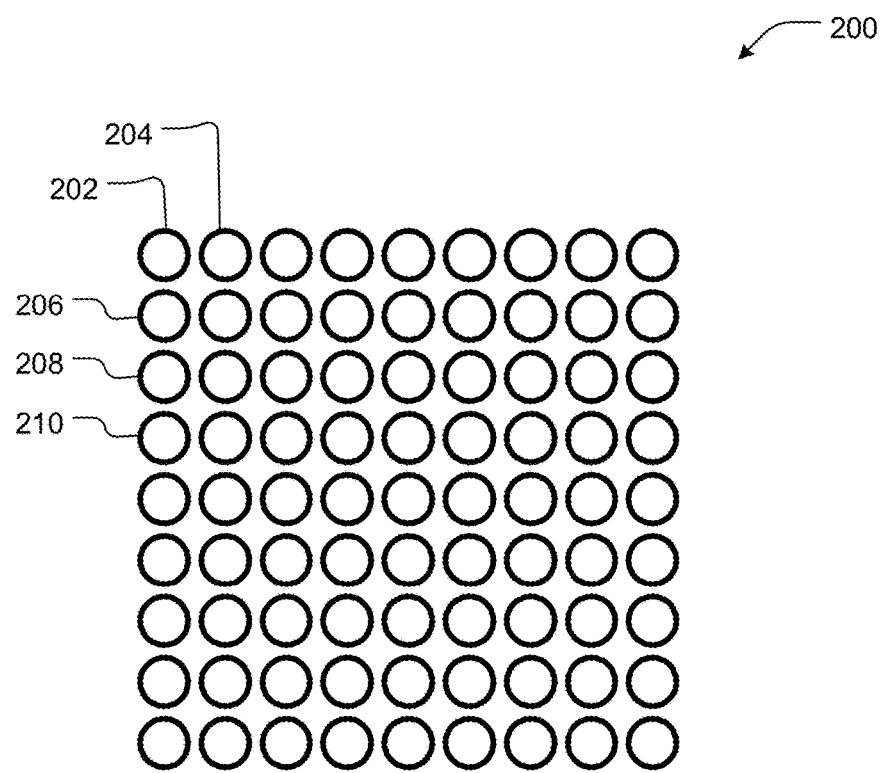
FIG. 2 is a schematic diagram illustrating a plurality of N ports on a surface of an optical switching array of the optical transmit/receive terminal of FIG. 1, according to an embodiment of the present invention.

FIG. 2 is a schematic diagram illustrating a plurality of N ports 200, represented by ports 202, 204, 206, 208 and 210, on the surface 107 of the optical switch 104. The plurality of ports 200 is shown as being arranged in a rectangular array. However, the ports 200 may be arranged in any suitable arrangement. If optical fibers 108 are used to couple the lens 102 to the optical switch 104, one or more optical fibers 108 may terminate at each port 202-210. The optical fibers 108 should be arranged so the image projected by the lens 102 is mapped to corresponding locations within the plurality of ports 200. Thus, each port 202-210 corresponds to a unique portion of the field of view of the lens 102.

Returning to FIG. 1, the optical switch 104 also has a single common input/output port 110. The optical switch 104 is configured to selectively optically couple one of the N ports 202-210 on the surface 107 to the common input/output port 110. Thus, in one mode, the optical switch 104 acts as an N×1 switch. That is, one of the N ports 202-210 is coupled to the common input/output port 110.

The terminal 100 also includes a suitable optical receiver 112, such as a photo diode, and/or a suitable transmitter 114, such as a laser. A LiDAR system or a two-way communication system includes both the transmitter 114 and the receiver 112. However, a one-way communication system needs to include only the receiver 112 or the transmitter, and a star tracker needs to include only the receiver 112. The receiver 112 and/or transmitter 114 are optically coupled to the common input/output port 110 by suitable optical couplings, represented by optical coupling 116, such as optical fibers, mirrors and/or splitters/combiners.

Thus, an optical signal from the transmitter 114 may be routed via the optical coupling 116 to the optical switch 104 and there switched to a selected one of the N ports 202-210. Once emitted from the surface 107 of the optical switch 107, the optical signal is conveyed to the lens 102, such as via the optical fiber terminated at the selected port 202-210, and then by the lens 102 into space. A direction in space, in which the optical signal is projected by the lens 102, depends on which port 202-210 is selected. Conversely, an optical signal received by the lens 102, such as a return signal in a LiDAR system, is routed by the optical switch to the receiver 112. A direction in space, from which the optical signal is received by the lens 102, depends on which port 202-210 is selected.

Figure 3:
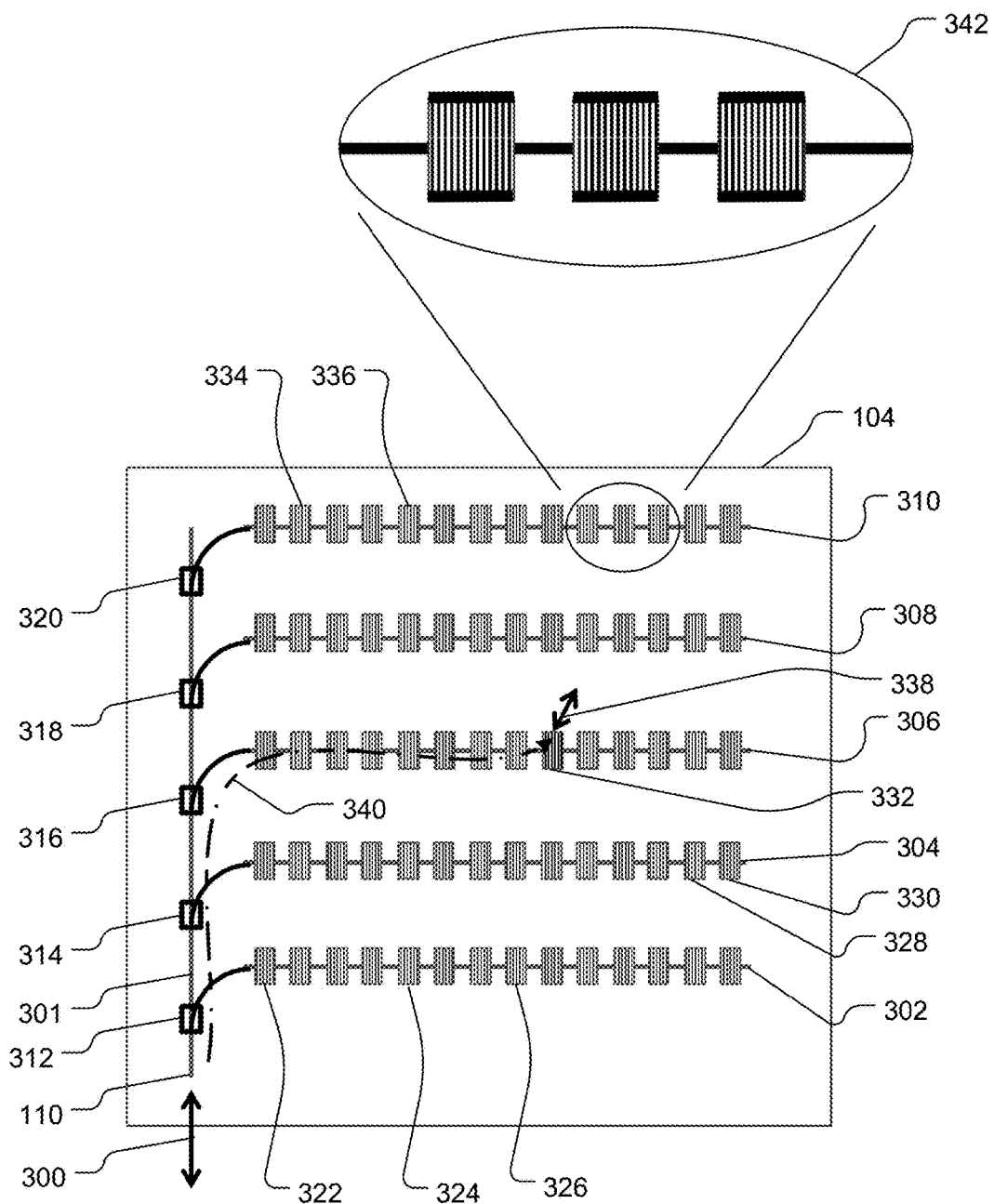
FIG. 3 is a schematic diagram illustrating the optical switching array of the optical transmit/receive terminal of FIG. 1, according to an embodiment of the present invention.

FIG. 3 is a schematic diagram illustrating the optical switch array 104, according to an embodiment of the present invention. The optical switch array 104 includes the common input/output port 110. Light may enter and/or exit the common input/output port, as indicated by a double-headed arrow 300. The common input/output port 110 is optically coupled to a first optical waveguide 301. The optical switch array 104 also includes a plurality of second optical waveguides, represented by optical waveguides 302, 304, 306, 308 and 310. Each second optical waveguide 302-310 is optically coupled to the first optical waveguide 301 via a respective first optical switch, represented by first optical switches 312, 314, 316, 318 and 320.

In some embodiments, each first optical switch 312-320 acts as a single-pole, double-throw (SPDT) switch. Thus, assuming light enters the common input/output port 110, the first optical switch 312 selectively either allows the light to continue along the first optical waveguide 301 or diverts the light to the second optical waveguide 302. Thus, collectively, the first optical switches 312-320 control to which second optical waveguide the light is diverted. Similarly, collectively the first optical switches 312-320 control from which second optical waveguide light is routed to the first optical waveguide and, thence, to the common input/output port 110. Although five second optical waveguides 302-310 and five first optical switches 312-320 are shown, any suitable number of second waveguides and first optical switches may be included.

A respective plurality of second optical switches, represented by second optical switches 322, 324, 326, 328, 330, 332, 334 and/or 336, is optically coupled to each second optical waveguide 302-310. For example, second optical switches 322-326 are optically coupled to the second optical waveguide 302. Each second optical switch 322-326 may selectively optically couple the respective second optical waveguide 302, 304, 306, 308 or 310 to free space. The second optical switches 322-326 may be coupled between the second optical waveguides 302-310 and the N ports 202-210 (FIG. 2), or each second optical switch 322-326 may form part or all of one of the N ports 202-210.

In some embodiments, each second optical switch 322-336 acts as a single-pole, double-throw (SPDT) switch. Thus, assuming light enters the common input/output port 110, the second optical switch 332 selectively either allows the light to continue along the second optical waveguide 306 or diverts the light out of the second optical waveguide 306, as indicated by a two-headed arrow 338. The two-headed arrow 338 extends out of the plane of the drawing. Thus, collectively, the second optical switches 322-336 control to which port of the N ports 202-210 the light is diverted. Similarly, collectively the second optical switches 322-336 control from which port of the N ports 202-210 light is routed to the first optical waveguide and, thence, to the common input/output port 110.

Although 14 second optical switches are shown coupled to each second optical waveguide 302-310, any number of second optical switches may be included. All the second optical waveguides 322-336 need not have equal numbers of second optical switches 322-336.

Each first and second optical switch 312-320 and 322-336 is a binary optical switch, i.e., an ON-OFF switch. Thus, the first and second optical switches 312-320 and 322-336 determine an optical route for an optical signal traveling through the switch array 104, between the common input/output port 110 and a selected port of the N ports 202-210, for example as exemplified by dashed line 340.

Each first optical switch 312-320 may be implemented by any suitable optical switch. In some embodiments, each first optical switch 312-320 is implemented by a pair of MEMS-actuated adiabatic optical couplers. Such a switch cell is described in Tae Joon Seok, et al., "Large-scale broadband digital silicon photonic switches with vertical adiabatic couplers," Optica, Vol. 3, No. 1, pp. 64-70, January, 2016, and Tae Joon Seok, et al., "Large-scale broadband digital silicon photonic switches with vertical adiabatic couplers: supplemental material," the entire contents of each of which is hereby incorporated by reference herein, for all purposes.

Figure 4:
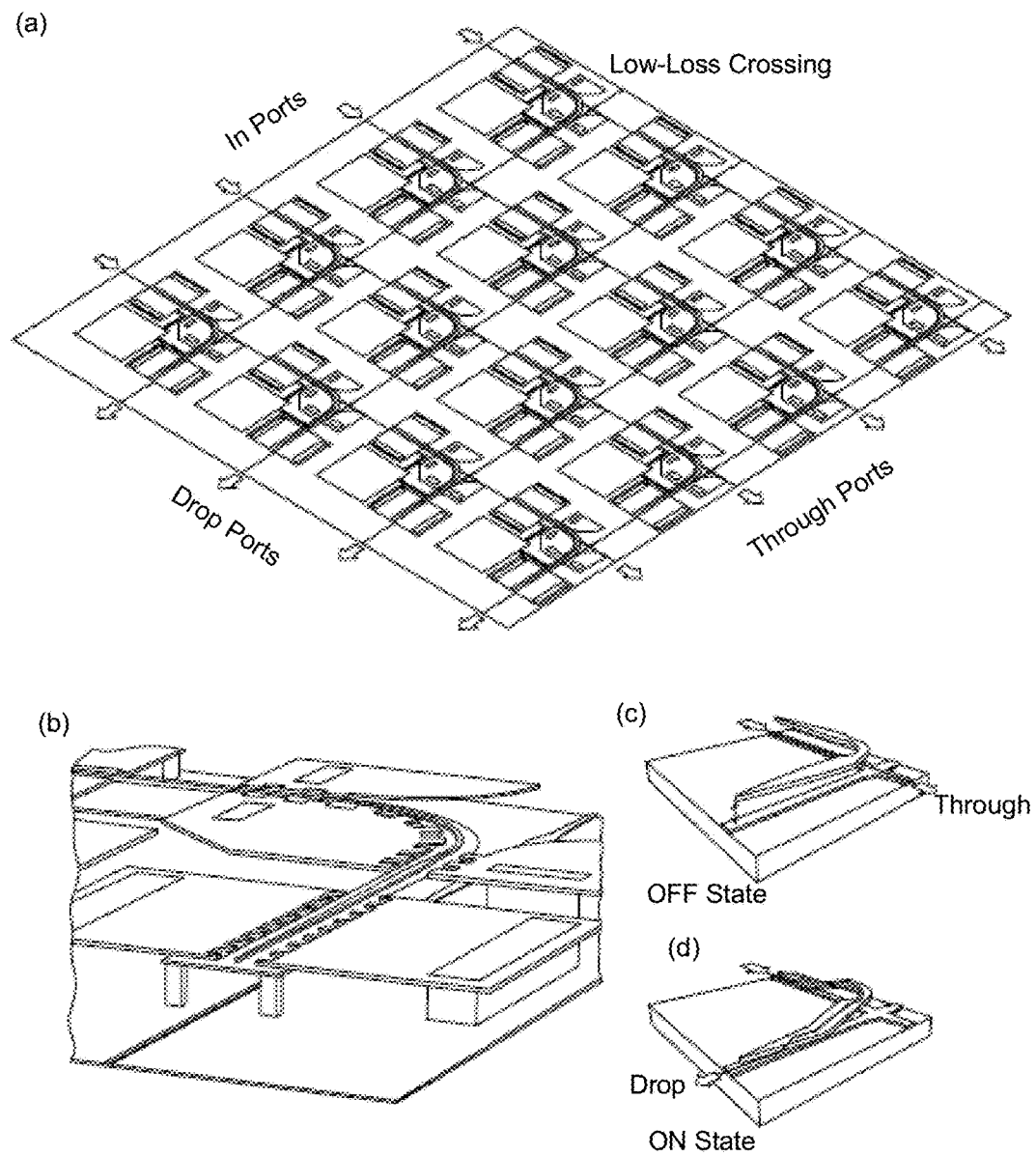
FIG. 4 provides several schematic views of first optical switches used in the optical switching array of the optical transmit/receive terminal of FIG. 1, according to the prior art.

Each first optical switch 312-320 may be implemented using two optical waveguides. However, unlike the work described by Seok, the two waveguides need not cross, but the principal of the switch is similar. A switching element that includes a pair of MEMS-actuated adiabatic couplers may be disposed optically between the two optical waveguides. See, for example, Seok, FIG. 1 (reproduced in the present application as FIG. 4).

In an OFF state, the adiabatic couplers are located far enough, such as about 1 μm, above, the optical waveguides so light continues to propagate along one of the waveguides, without appreciably coupling to the other waveguide. See Seok, FIG. 1(c) (reproduced in the present application in FIG. 4). However, in the ON state, the adiabatic couplers are physically moved toward the waveguides by MEMS electrostatic gap-closing actuators, and light is therefore efficiently coupled from one of the waveguides into the adiabatic coupler and between the adiabatic coupler and the other waveguide of the two waveguides. See Seok, FIG. 1(d) (reproduced in the present application in FIG. 4).

Alternatively, each first optical switch 312-320 may be implemented using a standard Mach-Zehnder interferometer type switch, for example with thermal phase shifters, as discussed in the '158 patent application.

As noted, the surface 107 (FIG. 1) of the optical switch 104 has N ports 202-210, and the lens 102 focuses incoming light rays 106 onto the N ports 202-210, and/or the lens 102 projects optical signals emitted via the N ports 202-210 into space. Optical gratings are efficient devices for emitting light out of the plane of the second optical waveguides 302-310 or coupling out-of-plane light into the second optical waveguides 302-310, as indicated by the two-headed arrow 338 (FIG. 3). An optical grating is a spatially periodic structure that defines a plurality of regions having a first refractive index, interspersed with regions having a different second refractive index. The spatial period is selected based on the wavelength of interest. In some cases, periodic grooves are defined in a material. In other cases, two different materials are alternated. For simplicity of explanation, the term "groove" is used herein to represent an actual groove, i.e., void, or one of the two alternating materials of an optical grating.

Such optical gratings may be disposed at or near the surface 107. Each second optical switch 322-336 may be implemented by such an optical grating. In particular, each second optical switch 322-336 may be implemented by a translatable optical grating, i.e., an optical grating that is configured to translate between at least two positions. In a first ("ON") position, the optical grating is sufficiently close to one of the second optical waveguides 302-310 to optically couple with the second optical waveguide with a coupling efficiency, at a wavelength of interest, of at least about 25%. In a second ("OFF") position, the optical grating is sufficiently far from the second optical waveguide to optically couple with the second optical waveguide with a coupling efficiency, at the wavelength of interest, of at most about 5%, preferably less than 1%. FIG. 3 shows three of the second optical switches 322-336 enlarged at 342.

Each second optical switch 322-336 may include a MEMS structure that is configured to selectively translate the translatable optical grating to the ON position and to the OFF position. FIG. 5 is a schematic top view of one optical switch 500 of the second optical switches 322-336. The optical switch 500 includes a translatable grating 502. The translatable grating 502 defines a plurality of parallel or approximately parallel periodic grooves. The grooves are separated by walls, represented by walls 504, 506 and 508. As noted, the grooves and walls may be implemented by respective materials having different refractive indexes. The walls 504-508 may be made of silicon, silicon nitride or another suitable material using conventional semiconductor fabrication techniques. The grooves may be voids or suitable material different from the walls 504-508. Although the translatable grating 502 is shown with six walls 504-508, any suitable number of walls and/or grooves may be used. The translatable grating 502 is disposed above a second optical waveguide 510, one of the second optical waveguides 302-310.

FIG. 6 is a schematic side view of the optical switch 500 in the OFF position. In the OFF position, the translatable optical grating 502 is disposed a distance 600 from the second optical waveguide 510 sufficient to optically couple with the second optical waveguide 510 with a coupling efficiency of at most about 5%, preferably less than 1%, and in some embodiments less than 0.1%. In some embodiments, the distance 600 is about 1 μm (1,000 nm). In some embodiments, the distance 600 may be about 800 nm. In some embodiments, the distance 600 may be about 250 nm. In the OFF position, most or substantially all light 602 in the second optical waveguide 510 continues along the second optical waveguide 510, as indicated by an arrow 604. Similarly, very little or substantially no light from free space couples via the optical grating 502 into the second optical waveguide 510.

The second optical waveguide 510 may be fabricated using conventional semiconductor fabrication techniques on a suitable semiconductor wafer, such as a silicon or silicon nitride wafer. The second optical waveguide 510 may be fabricated on a suitable oxide or other passivation layer 606.

FIG. 7 is a schematic side view of the optical switch 500 in the ON position. In the ON position, the translatable optical grating 502 is disposed a distance 700 from the second optical waveguide 510 sufficient to optically couple with the second optical waveguide 510 with a coupling efficiency of at most least 25%. In some embodiments, the distance 700 is about 10-50 nm. In the ON position, much, most or substantially all light 602 in the second optical waveguide 510 is emitted by the translatable optical grating 502 into free space, as indicated by an arrow 702. Similarly, much, most or substantially all light of a suitable mode from free space couples via the optical grating 502 into the second optical waveguide 510.

Figure 8:
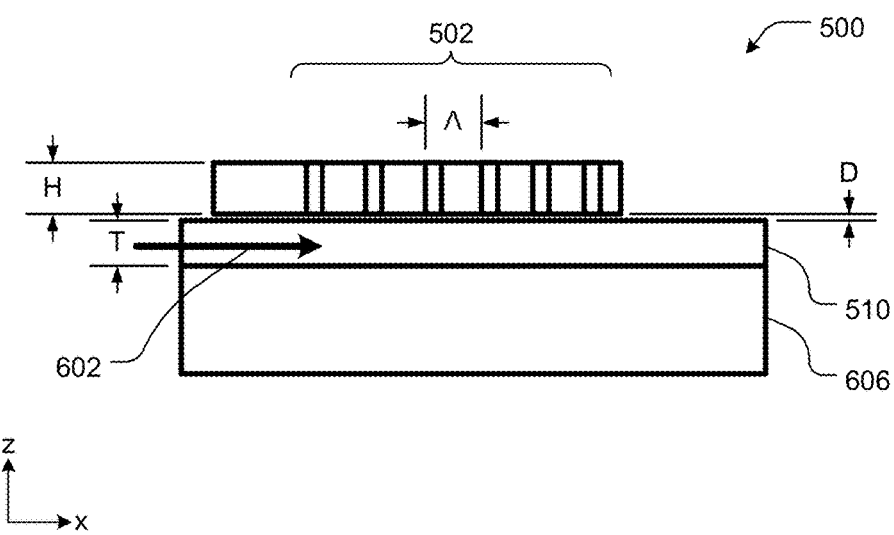
FIG. 8 is a schematic side view of the optical switch of FIG. 5 in the ON position showing representative dimensions, according to an embodiment of the present invention.

FIG. 8 is another schematic side view of the optical switch 500 in the ON position showing representative dimensions, according to an embodiment of the present invention. The translatable grating 502 is disposed a distance (D) about 20 nm from the second optical waveguide 510. The second optical waveguide 510 is about 150 nm thick (T) silicon on an oxide substrate 606. The input light beam 602 is a Gaussian with an about 2.5 μm radius. The translatable grating 502 is about 50 nm thick (H). The translatable grating 502 has a groove period (Λ) of about 580 nm. Appropriate modifications may be made, such as changing the groove period (Λ) for other wavelengths of light, as would be known by one of ordinary skill in the art.

Figure 9:
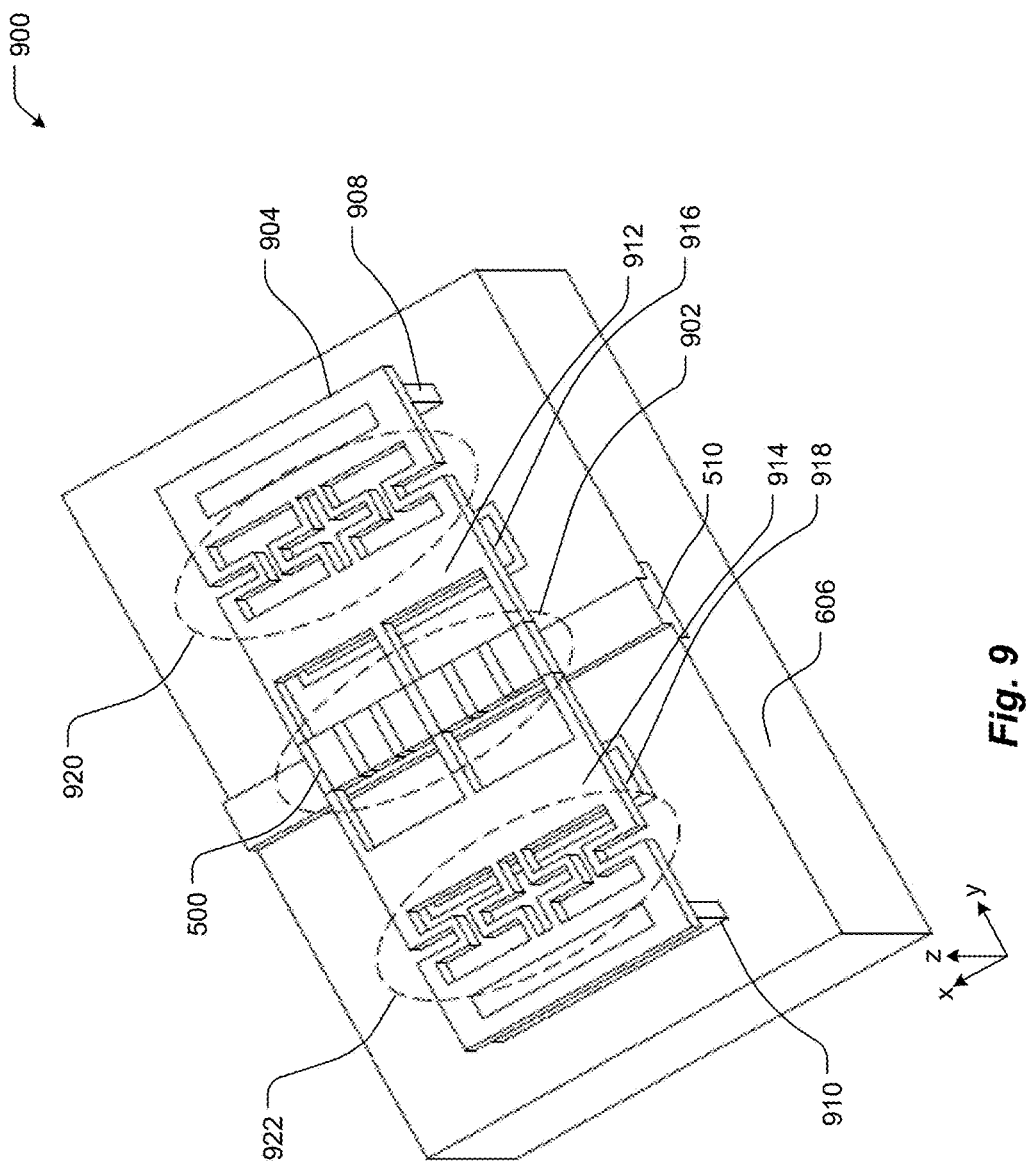
FIGS. 9 and 10 are respective schematic perspective and side views of the optical switch of FIG. 5 in the OFF position, showing an electrostatic MEMS structure configured to selectively translate the translatable optical grating to the ON position and to the OFF position, according to an embodiment of the present invention.
Figure 10:
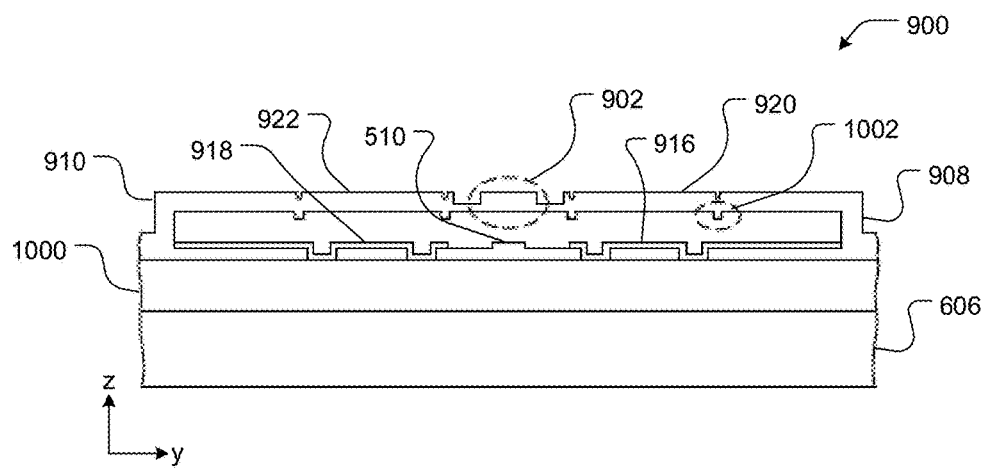
Figure 11:
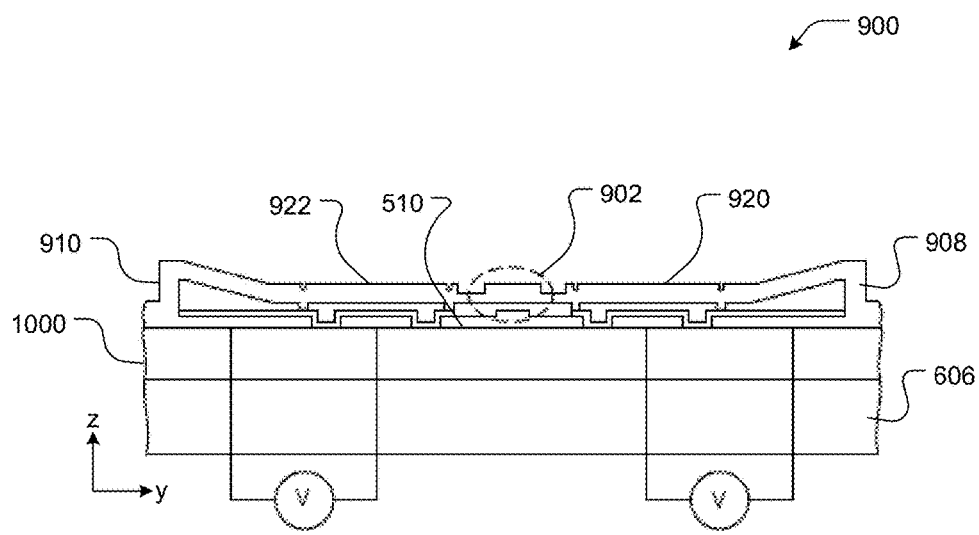
FIG. 11 is a schematic perspective side view of the optical switch of FIG. 5 in the ON position, according to an embodiment of the present invention.

As discussed with respect to FIGS. 5-7, each second optical switch 322-336 may include a MEMS structure that is configured to selectively translate the translatable optical grating 500 to the ON position and to the OFF position. FIGS. 9 and 10 are respective schematic perspective and side views of the optical switch 500 in the OFF position, showing an electrostatic MEMS structure 900 configured to selectively translate the translatable optical grating 500 to the ON position and to the OFF position. FIG. 11 is a schematic perspective side view of the optical switch 500 in the ON position. The translatable optical grating 500 is shown within a dashed ellipse 902.

The translatable optical grating 500 is part of a bridge 904. The bridge 904 is spaced apart from, and disposed above, the substrate 606. The substrate may include a buried oxide layer 1000 (FIGS. 10 and 11). The bridge 904 is supported by respective piers 908 and 910. The second optical waveguide 510 is disposed in or on the substrate 606 under the translatable optical grating 500.

The bridge includes two first electrostatic actuation electrodes 912 and 914. Two corresponding second electrostatic actuation electrodes 916 and 918 are disposed on the substrate 606, such that the two first actuation electrodes 912 and 914 register over the two second actuation electrodes 916 and 918, respectively. The bridge 904 also includes two flexures 920 and 922.

Thus, if an electric potential is applied across the first and second actuation electrodes 912-914 and 916-918, as shown schematically in FIG. 11, a resulting electrostatic force urges the first actuation electrodes 912-914 and the translatable optical grating 500 toward the substrate 606, thereby bringing the translatable optical grating 500 within an appropriate distance of the second optical waveguide 510 to turn the optical switch 500 ON. Absent such an electric potential and the resulting electrostatic force, the flexures 920 and 922 return the translatable optical grating 500 to the OFF position. A boss 1002 may be included to limit travel distance of the translatable optical grating 500 in the ON position. Other aspects of the MEMS structure 900 are similar to MEMS structures described in Seok and Seok supplement.

Figure 12:
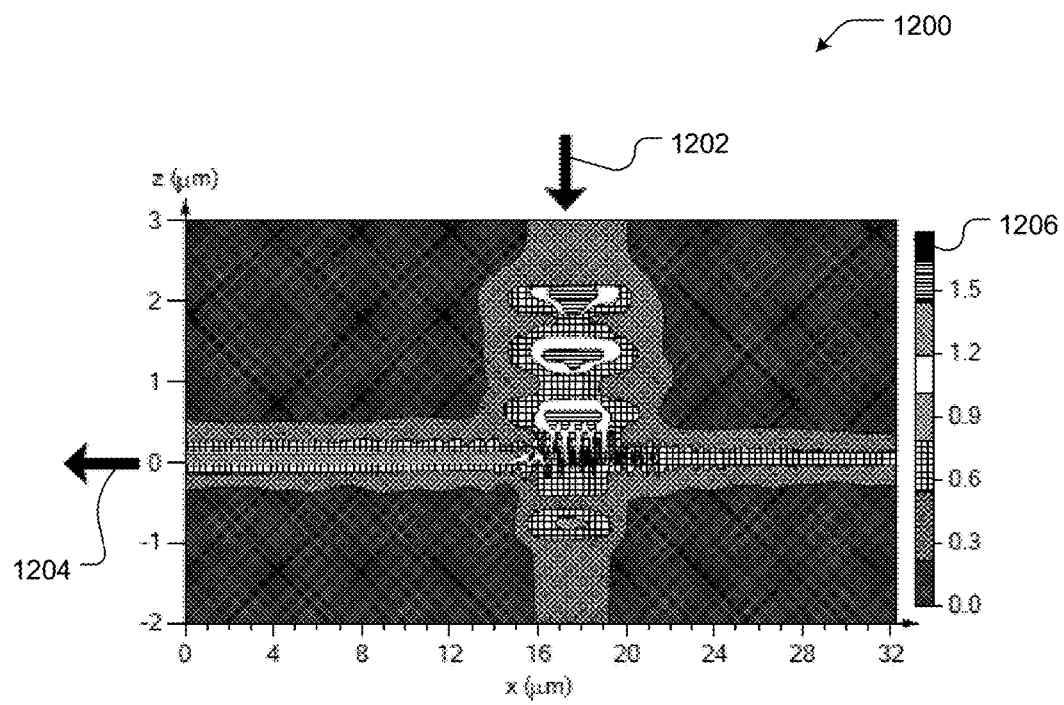
FIGS. 12 and 13 are graphs illustrating results of computer modeling E-field squared strength versus z-x location within the optical switch of FIG. 5 in the ON and OFF positions, respectively, according to an embodiment of the present invention.
Figure 13:
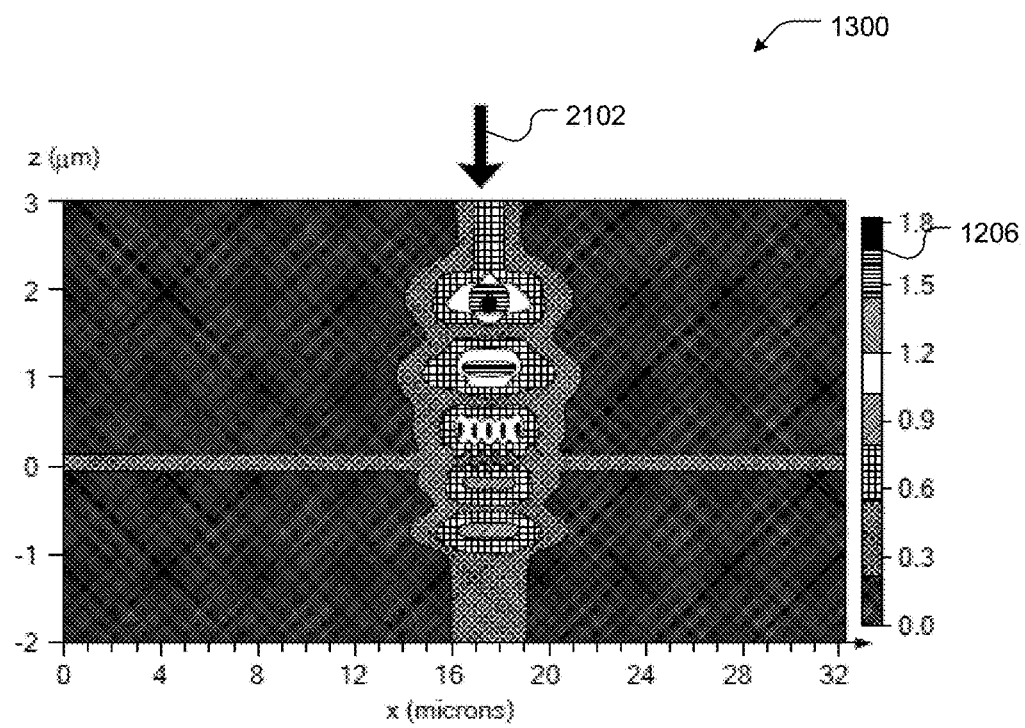

FIGS. 12 and 13 are graphs 1200 and 1300 illustrating modeled light intensity (E-field strength squared) versus z-x location within the optical switch 500 in the ON and OFF positions, respectively. In both plots, the optical waveguide 510 is horizontal, and light travels from free space into the optical waveguide 510, as indicated by arrows 1202. In FIG. 12, light that couples into the waveguide 510 via the translatable grating 502 is indicated by an arrow 1204. In both plots 1200 and 1300 the light wavelength is 1.5-1.6 µm, and the light intensity (E-field strength squared) is color coded 1206. For the plot 1200 (optical switch 500 ON), the translatable grating 502 is disposed 20 nm from the second optical waveguide 510, whereas for the plot 1300 (optical switch 500 OFF), the translatable grating 502 is disposed 250 nm from the second optical waveguide 510.

As can be seen in FIG. 3, a relatively small number, such as one each, of the first and second optical switches 312-320 and 322-336 needs to be operated to route an optical signal from the common input/output port 110 to the selected port 202-210. This small number of switches therefore consumes much less energy than phase shifters in a comparable optical phased array. In addition, the MEMS-based first and second optical switches 312-320 and 322-336 are smaller, and can therefore be fabricated or packed more densely, than phase shifters or binary optical switch of an H-tree.

In the described system and method, the first and second optical switches 312-320 and 322-336 fully direct the light down one path or another. It also possible to partition the optical switch 104 (FIG. 3) into multiple optical switch arrays, each operating independently and each handling a non-overlapping subset of the N ports 202-210. This is similar to including multiple optical switches 104 in the optical transmit/receive terminal 100 (FIG. 1). Multiple optical switch arrays 104 or a partitioned optical switch array 104 can handle multiple diverse light rays 106, i.e., each light ray 106 being directed in a different direction is space.

As used herein, a "dielectric" material is a material having an electrical conductivity no greater than about $10^{-6}$ Ω-m. As used herein, electrically "conductive" or an electrical "conductor" means having an electrical resistance less than about 100 kΩ.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:
1. A partitioned optical switch, comprising:
a plurality of optical switch arrays, each optical switch array of the plurality of optical switch arrays having a respective common port and a respective plurality of other ports that are distinct from other ports of other optical switch arrays of the plurality of optical switch arrays, each optical switch array of the plurality of optical switch arrays comprising:
a respective waveguide optically coupled to the respective common port; and
a respective plurality of optical switches disposed along the respective waveguide, wherein each optical switch of the plurality of optical switches is optically coupled between the respective waveguide and a respective port of the respective plurality of other ports, wherein each optical switch of the plurality of optical switches comprises:
a respective translatable optical grating configured to translate between at least two positions, a first position of the at least two positions being sufficiently close to the respective waveguide to optically couple with the respective waveguide with a coupling efficiency of at least about 25%, and a second position of the at least two positions being sufficiently far from the respective waveguide to optically couple with the respective waveguide with a coupling efficiency of at most about 5%; and
a respective MEMS structure configured to selectively translate the respective translatable optical grating to the first position and to the second position;

wherein the plurality of optical switch arrays defines a surface, and each optical switch of each respective plurality of optical switches is configured to optically couple between the respective waveguide and space beyond the surface of the plurality of optical switch arrays, when the respective optical switch is in the first position.

2. A partitioned optical switch according to claim 1, further comprising a respective optical receiver optically coupled to each common port.

3. A partitioned optical switch according to claim 1, further comprising a respective optical transmitter optically coupled to each common port.

4. A partitioned optical switch according to claim 1, further comprising a respective optical receiver optically coupled to each common port, and a respective optical transmitter optically coupled to each common port.

5. A partitioned optical switch according to claim 1, further comprising a respective optical receiver optically coupled to at least one common port.

6. A partitioned optical switch according to claim 1, further comprising a respective optical transmitter optically coupled to at least one common port.

7. A partitioned optical switch according to claim 1, further comprising a respective optical receiver optically coupled to at least one common port, and a respective optical transmitter optically coupled to at least one common port.

8. A partitioned optical switch according to claim 1, further comprising a respective optical receiver optically coupled to each port of a first set of common ports, and a respective optical transmitter optically coupled to each port of a second set of common ports.

9. A partitioned optical switch according to claim 1, wherein, collectively, the plurality of other ports of the plurality of optical switch arrays are arranged in a rectangular array.

10. A partitioned optical switch according to claim 1, wherein each plurality of other ports is arranged in a rectangular array.

11. A partitioned optical switch according to claim 1, wherein each plurality of other ports is arranged in a single respective row.

12. A partitioned optical switch according to claim 11, further comprising a respective optical receiver optically coupled to each common port.

13. A partitioned optical switch according to claim 11, further comprising a respective optical transmitter optically coupled to each common port.

14. A partitioned optical switch according to claim 11, further comprising a respective optical receiver optically coupled to each common port, and a respective optical transmitter optically coupled to each common port.

15. A partitioned optical switch according to claim 11, further comprising a respective optical receiver optically coupled to at least one common port.

16. A partitioned optical switch according to claim 11, further comprising a respective optical transmitter optically coupled to at least one common port.

17. A partitioned optical switch according to claim 11, further comprising a respective optical receiver optically coupled to at least one common port, and a respective optical transmitter optically coupled to at least one common port.

18. A partitioned optical switch according to claim 11, further comprising a respective optical receiver optically coupled to each port of a first set of common ports, and a respective optical transmitter optically coupled to each port of a second set of common ports.

19. A partitioned optical switch according to claim 1, wherein each other port of each respective plurality of other ports is optically coupled to free space.

20. A partitioned optical switch according to claim 1, wherein the plurality of optical switch arrays defines a planar surface, and the plurality of other ports are disposed on the planar surface.

21. A partitioned optical switch according to claim 1, further comprising a lens optically coupling the plurality of optical switch arrays to free space.

22. A partitioned optical switch according to claim 21, further comprising a plurality of optical fibers optically coupling the plurality of other ports to the lens.

* * * * *